US010732913B2

(12) United States Patent
Zhou et al.

(10) Patent No.: US 10,732,913 B2
(45) Date of Patent: Aug. 4, 2020

(54) SYSTEM AND METHOD FOR MULTI-SITE CELLULAR MANUFACTURING WITH TRANSPORTATION DELAYS

(75) Inventors: Rong Zhou, San Jose, CA (US);
Sudhendu Rai, Fairport, NY (US);
Minh Binh Do, Palo Alto, CA (US);
Craig Lambrecht, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 1484 days.

(21) Appl. No.: 13/156,573

(22) Filed: Jun. 9, 2011

(65) Prior Publication Data

US 2012/0314248 A1 Dec. 13, 2012

(51) Int. Cl.
*G06F 3/12* (2006.01)
*G06Q 10/06* (2012.01)
*H04N 1/32* (2006.01)

(52) U.S. Cl.
CPC ............ *G06F 3/1282* (2013.01); *G06F 3/126* (2013.01); *G06F 3/1212* (2013.01); *G06F 3/1238* (2013.01); *G06Q 10/0631* (2013.01); *H04N 1/32545* (2013.01)

(58) Field of Classification Search
USPC ...................................................... 358/1.15
See application file for complete search history.

(56) References Cited

U.S. PATENT DOCUMENTS

| | | | |
|---|---|---|---|
| 5,287,194 A * | 2/1994 | Lobiondo | 358/296 |
| 6,822,754 B1 * | 11/2004 | Shiohara | G06F 3/1211 358/1.13 |
| 6,895,292 B2 | 5/2005 | Fromherz | |
| 7,051,328 B2 | 5/2006 | Rai | |
| 7,065,567 B1 | 6/2006 | Squires | |
| 7,079,266 B1 | 7/2006 | Rai | |
| 7,125,179 B1 | 10/2006 | Rai et al. | |
| 7,126,717 B2 | 10/2006 | Jeyachandran et al. | |
| 7,430,056 B2 | 9/2008 | Rai et al. | |
| 7,755,778 B2 | 7/2010 | Rai | |
| 8,958,104 B2 * | 2/2015 | Comstock et al. | 358/1.15 |
| 2001/0003180 A1 * | 6/2001 | Sakai et al. | 705/40 |
| 2001/0021311 A1 * | 9/2001 | Mizumo | 396/429 |
| 2002/0095352 A1 * | 7/2002 | Hitaka | 705/26 |
| 2003/0053112 A1 * | 3/2003 | Motosugi et al. | 358/1.14 |
| 2004/0184080 A1 * | 9/2004 | Gotoh et al. | 358/1.15 |
| 2004/0190967 A1 * | 9/2004 | Mizuno et al. | 400/76 |
| 2004/0199303 A1 * | 10/2004 | Ohmura et al. | 701/5 |
| 2005/0065830 A1 * | 3/2005 | Duke | G06Q 10/04 705/7.21 |

(Continued)

*Primary Examiner* — Nicholas Pachol
(74) *Attorney, Agent, or Firm* — Fay Sharpe LLP

(57) ABSTRACT

A system and method is used to manage scheduling of a plurality of print jobs in a multi-site print shop environment. The multi-site environment includes a plurality of print shops each having resources and equipment to complete at least one type of print job. Also included is a multi-site scheduler configuration arranged to assign and schedule print jobs to one of a home shop and a non-home shop. The assigning and scheduling is based on a fastest completion time, wherein a completion time of a print job in a home shop is defined as the actual time taken to complete the print job and a completion time of a print job in a non-home shop is defined as the actual time taken to complete the print job and a transportation delay.

23 Claims, 6 Drawing Sheets

(56) References Cited

U.S. PATENT DOCUMENTS

| | | |
|---|---|---|
| 2005/0190400 A1* | 9/2005 | Redd et al. .................. 358/1.15 |
| 2007/0019228 A1* | 1/2007 | Rai et al. ..................... 358/1.15 |
| 2007/0204226 A1 | 8/2007 | Hindi |
| 2007/0247657 A1 | 10/2007 | Zhang |
| 2007/0247659 A1 | 10/2007 | Zhang et al. |
| 2008/0144084 A1 | 6/2008 | Rai |
| 2008/0158574 A1* | 7/2008 | Sugiyama ..................... 358/1.1 |
| 2008/0239376 A1* | 10/2008 | Nishimi et al. .............. 358/1.15 |
| 2010/0195155 A1* | 8/2010 | Gustafson ............. G06Q 10/06 358/1.15 |
| 2010/0238484 A1* | 9/2010 | Komine ................ G06F 3/1204 358/1.15 |
| 2010/0253968 A1* | 10/2010 | Nuggehalli ............. G06F 3/126 358/1.15 |
| 2010/0302587 A1* | 12/2010 | Kawabata et al. ........... 358/1.15 |
| 2011/0010543 A1* | 1/2011 | Schmidt ................ H04W 12/10 713/168 |
| 2011/0019223 A1 | 1/2011 | Ocke et al. |
| 2011/0066269 A1 | 3/2011 | Zhou et al. |
| 2011/0286016 A1* | 11/2011 | LaVigne et al. ................ 358/1.9 |
| 2012/0218590 A1* | 8/2012 | Dumitrescu et al. ........ 358/1.15 |
| 2013/0003126 A1* | 1/2013 | Van Osdol et al. ......... 358/1.15 |

\* cited by examiner

SYSTEM AND METHOD FOR MULTI-SITE CELLULAR MANUFACTURING WITH TRANSPORTATION DELAYS

BACKGROUND

The present application is directed to the planning and scheduling arts, and more particularly to planning and scheduling of jobs for the production or manufacture of products, where the products may be produced or manufactured at a plurality of distributed sites or shops.

The problem of planning and scheduling in a distributed manufacturing environment with multiple shop locations is a natural extension to the basic "single-site" setup in which all production activities take place at one centralized location. To better consolidate resources and reduce costs, there is a need to provide high-throughput planning and scheduling capabilities for "multi-site" shops with geographical constraints. This feature is now missing from existing document production toolkits, such as the Lean Document Production (LDP) toolkit developed by Xerox Corporation. The absence of this capability in existing toolkits, limits their application to multi-site or shop environments.

Lean Document Production (LDP) offered by Xerox is a successful example of cellular manufacturing for the printing industry. LDP organizes equipment and resources in a print shop into separate cells, in order to increase the efficiency of print shop layout which in turn eliminates workflow bottlenecks, and reduces work-in-progress in the print shop. LDP implementations have so far been applied to shops that assume a single geographical location (i.e., single-site shops), and the option to schedule jobs among multiple single-site shops has been left largely unexplored. One reason for this is that multi-site scheduling can be computationally expensive, especially since some of the large single-site shops have already caused the current LDP toolkit to run out of memory or take several hours to find a complete schedule. While some of these issues can be fixed with a more efficient implementation, the lack of a formal scheduling framework for dealing with shops spanning multiple geographical locations presents a challenge. Simply put, there is currently no multi-site scheduling capability in LDP or similar products for the printing industry.

INCORPORATION BY REFERENCE

U.S. Patent Application Publication No 20070204226, by Hindi et al., entitled, "System And Method For Manufacturing System Design And Shop Scheduling Using Network Flow Modeling"; U.S. Patent Application Publication No. 20040225394, by Fromherz et al., entitled, "Predictive And Preemptive Planning And Scheduling For Different Job Priorities System And Method"; U.S. Patent Application Publication No. 20080144084, by Rai, entitled, "Method For Managing One Or More Print Processing Queues"; U.S. Pat. No. 7,065,567, by Squires et al., entitled, "Production Server For Automated Control Of Production Document"; U.S. Pat. No. 7,079,266, by Rai, et al., entitled, "Printshop Resource Optimization Via The Use Of Autonomous Cells"; and U.S. Pat. No. 7,051,328, by Rai et al., entitled, "Production Server Architecture And Methods For Automated Control Of Production Document Management"; U.S. Patent Application Publication No. 20070236724, by Rai et al., entitled, "Print Job Management System"; U.S. Patent Application Publication No. 20070247657, by Zhang et al., entitled, "Print Job Management System"; U.S. Patent Application Publication No. 20070247659, by Zhang, entitled, "Print Job Management System"; U.S. Pat. No. 7,125,179, by Rai et al, entitled, "System And Method of Evaluating Print Shop Consolidation Options In An Enterprise"; U.S. Pat. No. 7,126,717, by Jeyachandran et al, entitled, "Apparatus And Method For Performing A Specific Process Based On A Set Up Condition, And A Storage Medium For Such A Program"; U.S. Pat. No. 7,430,056, by Rai et al, entitled, "System and Method Of Evaluating Print Shop Consolidation Options In An Enterprise"; U.S. Patent Application Publication No. 20110019223, by Ocke et al, entitled, "System And Method For Automated Generation Of A Fully Parameterized Workflow Plan"; and US patent Application Publication No. 20110066269, by Zhou et al, entitled "System And Methods For Dynamic Scheduling In Cellular Manufacturing With Batch-Splitting", each of the above being incorporated herein by reference in their entireties.

BRIEF DESCRIPTION

A system and method is used to manage scheduling for a plurality of print jobs in a multi-site print shop environment. The multi-site environment includes a plurality of print shops each having resources and equipment to complete at least one type of print job. Also included is a multi-site scheduler configuration arranged to assign and schedule print jobs to one of a home shop and a non-home shop. The assigning and scheduling is based on a fastest completion time, wherein completion time of a print job in a home shop is defined as the actual time taken to complete the print job, and completion time of a print job in a non-home shop is defined as the actual time taken to complete the print job and a transportation delay.

DETAILED DESCRIPTION

For purposes of discussion but without limiting the concepts presented herein, a "print shop" refers to a grouping of printing resources. The print shop may be a freestanding entity such as a commercial printer or may be part of a corporation or other entity. A "print job" refers to a logical unit of work that is to be completed for a customer. For example, a request to make 1,000 copies of a book is a print job. Similarly, a request to make 100 copies of a single document is a print job. A production function can be any operation or processing step involved in the processing of the print job. For example, a production function can be black & white printing, color printing, scanning, or packaging. Therefore the print job entails a document processing operation.

Figure 1:
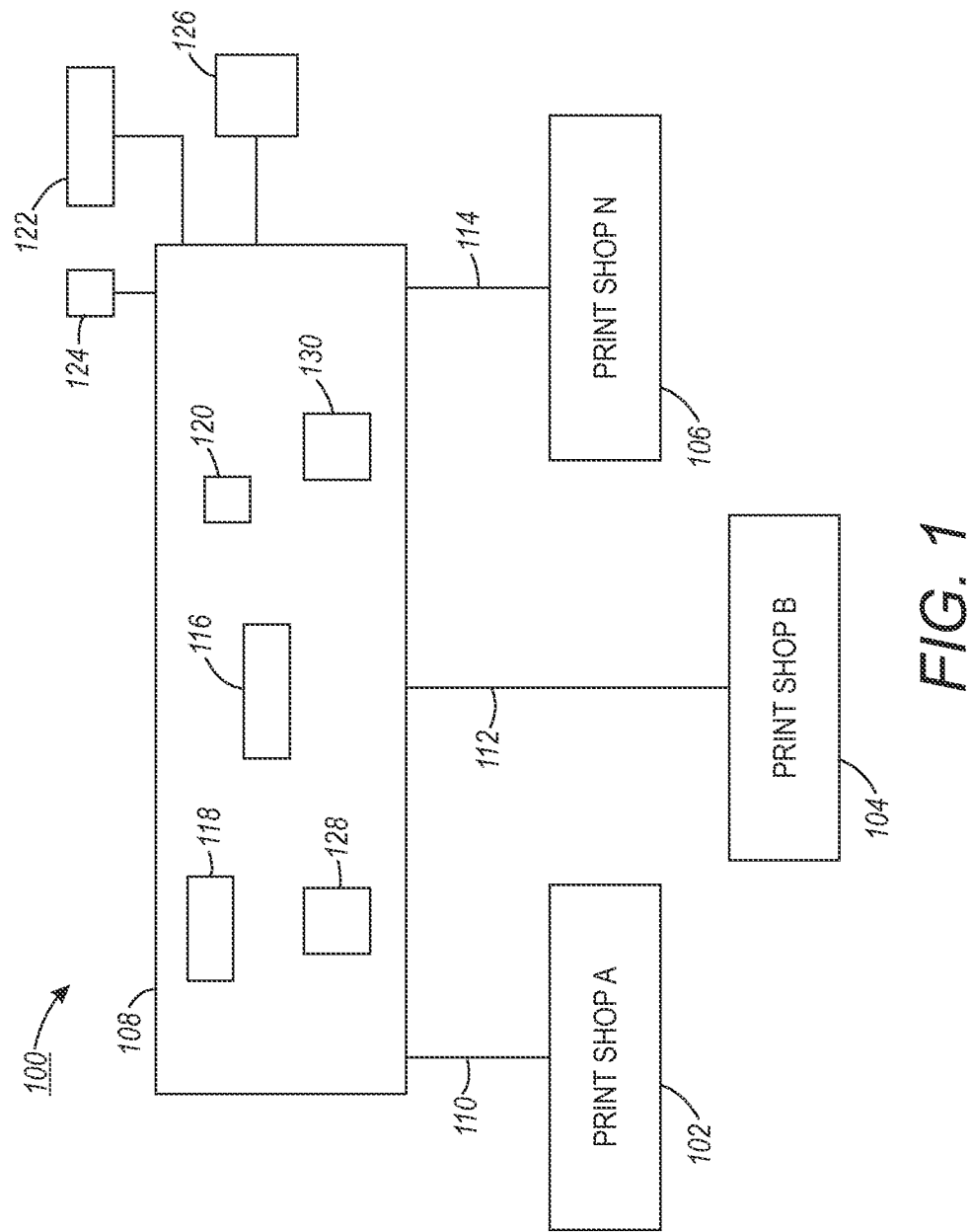
FIG. 1 illustrates a multi-site cellular manufacturing environment.

Turning to FIG. 1 illustrated is a multi-site print shop environment 100 to which the concepts of the present application are directed. More particularly, a plurality of individual single-site print shops, including Print Shop A 102, Print Shop B 104 . . . Print Shop N 106, are in operational communication with a multi-site scheduler configuration 108.

The print shops may be geographically distant from each other and/or the multi-site scheduler 108. Communication lines 110, 112, 114 represent multiple types of communication connections, including communication via telephone lines, internet connections, wireless communication, among others. Also, while multi-site scheduler 108 is shown to be distanced from each of the print shops, in certain embodiments the multi-site scheduler 108 is physically co-located with one of the print shops. In other embodiments multi-site scheduler 108 is a distributed configuration where portions are at different print shop locations, and/or there may be a parallel implementation of a plurality of multi-site scheduler configurations at a plurality of the print shops.

Multi-site scheduler 108 is configurable in a variety of arrangements and components. In one exemplary embodiment it is designed as an electronic computational apparatus comprising an electronic processor 116, a main memory 118, an input/output controller 120, a keyboard and/or voice input device 122, a pointing device 124 (e.g., mouse, track ball, pen device, or the like), a display device 126 and a mass storage 128 (e.g., hard disk). Additional components, such as a rendering device 130, may be included as part of multi-site scheduler 108 as desired. In one embodiment the components communicate with each other through a system bus or similar architecture.

Programs defining functions of the present application can be delivered to multi-site scheduler 108 via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media such as computer and telephone networks including Ethernet, the Internet, wireless networks, and like network systems.

The individual print shops (102, 104, 106) are provided with resources and equipment to produce print jobs. These resources and equipment may vary from shop to shop, in other words each print shop is not required to be identical to other ones of the print shops. At least some of the print shops are designed in a cellular type configuration and are operated in accordance with a cellular control, such as described within the documents which have been incorporated by reference herein.

Figure 2:
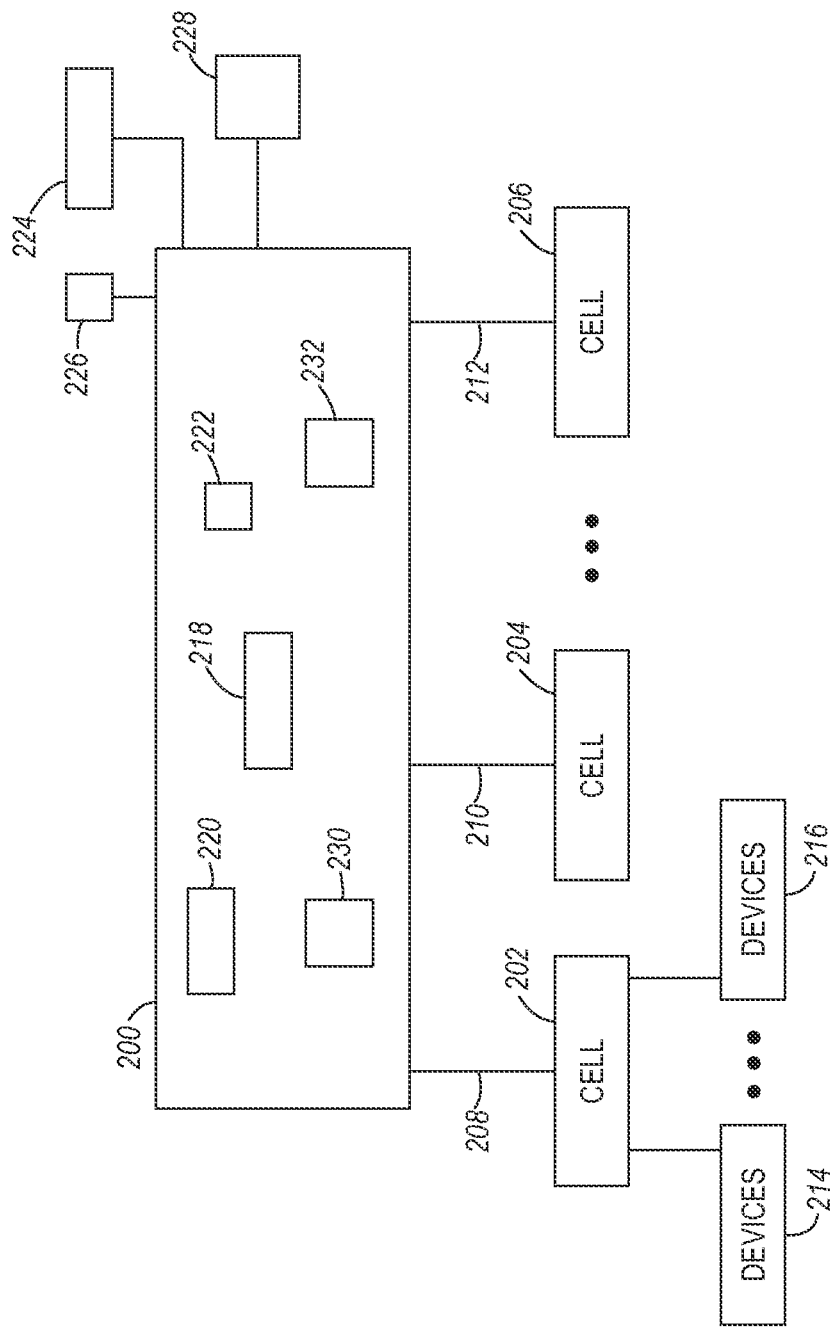
FIG. 2 illustrates a single shop of the multi-site environment.

As an example of a cellular print shop arrangement attention is directed to FIG. 2 (which may be any of print shops 102, 104 or 106). Printing workflow system 200, which is in communication with multi-site scheduler 100 (e.g., via line one of communication lines 110, 112 or 114), controls a plurality of cells 202-206, and sends information to and receives information from cells 202-206 via communication links 208, 210 or 212. The cells 202-206 are comprised of at least one device for assisting in completing a document processing job of given product-types. For example, printing device 214 could be a 600 dpi monochrome printer, while printing device 216 could be a 1200 dpi color printer. These of course are only examples and many other processing devices may be included as part of a cell.

Printing workflow system 200 may be configured in a variety of embodiments, including as an electronic processing system (similar to the arrangement shown in FIG. 1), which includes an electronic processor 218, a main memory 220, an input/output controller 222, a keyboard and/or voice input device 224, a pointing device 226 (e.g., mouse, track ball, pen device, or the like), a display device 228 and a mass storage 230 (e.g., hard disk). Additional components, such as a rendering device 232, may be included as part of workflow system 200 as desired. In one embodiment the components communicate with each other through a system bus or similar architecture. The workflow system 200 receives potential print jobs to be scheduled from multi-site scheduler 100 (FIG. 1). If the particular print job is to be undertaken, electronic processor 216 executes programming instructions to manage the actual document processing operations of the print job.

Figure 3:
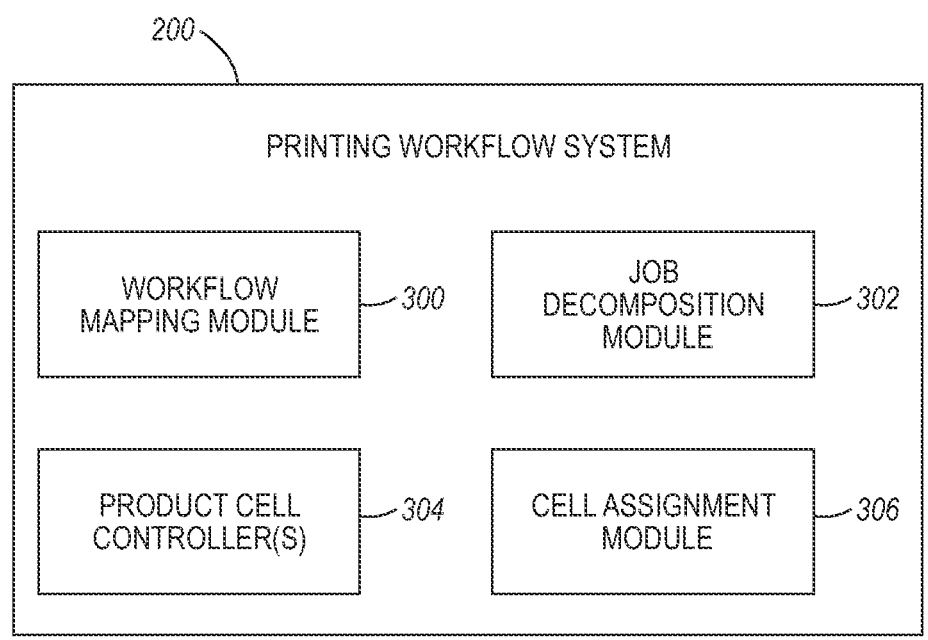
FIG. 3 is an illustration of software components employed in the production workflow system of FIG. 2.

To perform the document processing operations the workflow system 200 is provided with processing modules 300-306 of FIG. 3 and other data which may be stored, for example, in main memory 220 and/or hard disk memory 230.

The processing modules more particularly include workflow mapping module 300 that determines the workflow for selected document processing jobs. The workflow module, among other things, identifies the operational steps needed to complete a document processing job, and the sequence in which these operational steps should be performed. A job decomposition module 302 is included for splitting the document processing jobs into batches or sub-jobs and for sending the batches to cells for completion. A product cell controller (PCC) 304 may be provided at given cells for receiving at least one batch to be processed by a device in the cell. Lastly, a cell assignment module 306 is provided for assigning batches to be processed by a cell.

With regard to the multi-site cellular system described in connection with FIGS. 1-3, providing a scheduling of print jobs that improves the overall efficiency of document production in the multi-site system is considered to be useful.

Therefore turning now more particularly to the multi-site scheduling framework of the present disclosure, inter-shop transportation delays are explicitly modeled as an intrinsic scheduling constraint. This scheduling includes the use of a computationally efficient algorithm for solving multi-site scheduling problems which occur in the multi-site environment. It is also noted that in addition to solving issues in multi-site environments, the present system and method is also capable of addressing efficiencies in single-site shops with multiple cells having non-trivial transportation delays between cells. These situations are considered special cases of the more general multi-site problems. In fact, in one embodiment, the implementation disclosed herein supports both single and multi-site scheduling in the same executable/library file.

To model the inter-shop transportation delay, a matrix representation is used that contains one entry for each direction of transportation between a pair of shops. An example is shown in Table 1.

TABLE 1

| Inter-shop delay matrix in hours. | | | |
|---|---|---|---|
| Delay in hours | A | B | C |
| A | 0 | 24 | 48 |
| B | 24 | 0 | 72 |
| C | 36 | ∞ | 0 |

In Table 1 the multi-site shop environment has three locations; namely sites A, B, and C. The inter-shop delay from site $s_i$ to $s_j$ is shown on the i-th row and j-th column of the matrix. For example, the transportation delay from site A to itself is zero (no delay), one day (24 hours) from site A to site B, and two days from site A to site C. It is common that the delays are the same in both directions (e.g., in Table 1: A→B and B→A both have a delay of 24 hours). However, the delays are not always the same (e.g., Table 1: A→C has a delay of 48 hours, whereas the delay C→A is only 36 hours). For illustration purpose, Table 1 includes an extreme case in which the delay from C to B is infinite (∞), which may or may not reflect the real-world transportation delay. The reason for having a delay of infinity is to support organizational or operational constraints such as "site B can send jobs to site C but not the other way around, because site B does not have the same security clearance level as site C does." The system of the present application distinguishes two types of connections: symmetric and asymmetric. For the former, the user only needs to specify the delay in one direction, and the delay in the opposite direction is automatically deduced. For the latter, both need to be specified.

In a multi-site setting, there may be jobs that can be handled by more than one shop, although this is not strictly required. The minimum requirement for multi-site scheduling, however, is such that for any job there must be at least one shop that can handle the job and the shop is designated as the "home shop" for the job. A home shop can be designated automatically by the system or a user may identify the home shop. The explicit identification of a home shop generalizes the notion of shop as understood in single-site scheduling, in which a single shop is supposed to handle all the jobs. A job must specify its home shop, which is guaranteed to have all the necessary equipment and resources to complete the job (otherwise an error is reported), as in the single-site case. However, if a job cannot be processed by a shop other than its home shop, it is still acceptable in the multi-site case (although a warning message may be issued). The idea is to allow non-uniform shops where each location may have equipment that is available only in some but not all locations, and thus it is acceptable to have jobs that can only be handled by a subset of the shops.

Besides the notion of home shop, multi-site scheduling introduces another concept based on whether or not a job can be outsourced from its home shop to another shop. If so, the job is labeled outsourceable; otherwise it is non-outsourceable (i.e., statically bound to its home shop with no chance of being outsourced). This gives the shop owner fine-grained control over which jobs can be migrated to other shops and which cannot (for various reasons among which security can be one).

A job is referred to as a local job for a particular shop if the shop is designated as the home shop for the job. In this embodiment a job is required to have exactly one home shop (as will be expanded on below, in other embodiments this requirement may be relaxed). Obviously, a local job can either be outsourceable or non-outsourceable. Thus, without loss of generality a shop can have a maximum of two local job lists, which contain only the jobs for which the shop is designated as their home shop. Of the two local job lists, one has all the outsourceable local jobs and the other the non-outsourceable ones. Since a job must specify its home shop, it is straightforward to show that (a) any job must belong to the local job list of some shop and that (b) the union of all local jobs covers the entire set of jobs.

In a multi-site setting, a shop can have zero, one and/or two local job lists, covering the following four cases:

Case 1: Zero local job list, if the shop does not have any local jobs (i.e., it only handles outsourced jobs).

Case 2: One outsourceable local job list, if the shop only has outsourceable local jobs.

Case 3: One non-outsourceable local job list, if the shop only has non-outsourceable local jobs.

Case 4: Two local job lists, if the shop has both types of local jobs (i.e., outsourceable and non-outsourceable).

Note that only Case 3 above corresponds to the traditional single-site case, and all the other three cases are new concepts of multi-site scheduling with no obvious single-site counterparts. One reason to distinguish these four cases is to increase code re-use and ensure backward compatibility with single-site job lists and scheduling algorithms.

Next a particular scheduling algorithm is provided (as also described in a flow diagram in FIG. 2) according to the present application. The algorithm takes advantage of the un-utilized/under-utilized capacities of single-site shops in a multi-site manufacturing environment to boost the overall throughput and performance (e.g., to reduce the number of late jobs).

To accomplish this goal the algorithm implements the idea that if an outsourceable job is handled by its home shop, then no extra transportation delay is added to the actual completion time of the job in order to meet its deadline. In other words, the job is considered to be completed in the multi-site sense the moment it is completed by its home shop. However, if a job is produced by a shop other than its home shop, it can still be considered as "late" even if it is completed on or before the deadline, because by the time the job is transported back to the home shop, the extra inter-shop delay may cause the job to be late. Here an assumption is made that the due date for a job is defined with respect to its home shop (As will be explained below, in other embodiments this restriction may be relaxed). Also, for this embodiment it is assumed that the job requests are sent to a non-home shop from the home shop in a manner which creates no detectable delay. For example the job request may be sent via the internet.

The representative algorithm used in the present disclosure to implement these concepts will now be discussed more specifically. This algorithm lets S represent the set of single-site shops considered in a multi-site setup; Lets J be the set of jobs, of which $J_{os}$ is the set of outsourceable jobs and $J_{no}$ is the set of non-outsourceable jobs; Lets $D(s_i, s_j)$ be the inter-shop delay from shop $s_i \in S$ to shop $s_j \in S$; Lets the function: homeshop(j) return the home shop of job $j \in J$; and Lets function: can-handle(s, j) return true if and only if shop s can handle job j (i.e., the shop has all the necessary equipment and resources to complete the job). With the understanding the algorithm is presented as:

1. foreach shop $s \in S$ do
    a.    $J_{no}(S) \leftarrow \{j \in J_{no} \mid homeshop(j) = s\}$
    b.    Schedule all jobs $j \in J_{no}(s)$ in shop s
    c.    Record resource allocations (e.g. equipment, operators, consumables, etc.) in $R_s$

```
2. foreach outsourceable job j ∈ J_os do
    a.  s ← homeshop(j)
    b.  Schedule job j in shop s subject to R_s
    c.  f_s ← finish time of job j in shop s
    d.  r_s ← resource allocation made for job j in shop s
    e.  S' ← { s' ∈ S | s' ≠ s and can-handle(s',j) = true }   /* set of non-home shops for j */
    f.  foreach non-home shop s' ∈ S' do
        1) Schedule job j in shop s' subject to R_s'
        2) f_s' ← finish time of job j in shop s'
        3) f_s' ← f_s'+D(s',s)          /* add transportation delay to home shop s */
        4) r_s' ← resource allocation made for job j in shop s'
    g.  s* ← argmin_{s∈S} {f_s}          /* find "best" shop that has the earliest finish time */
    h.  R_s* ← R_s*∪{ r_s*}              /* add resource allocation to "best" shop */
    i.  if s ≠ s* then O_s ← O_s ∪ {j}   /* Optional step to update set of outsourced jobs for s */
```

Figure 4:
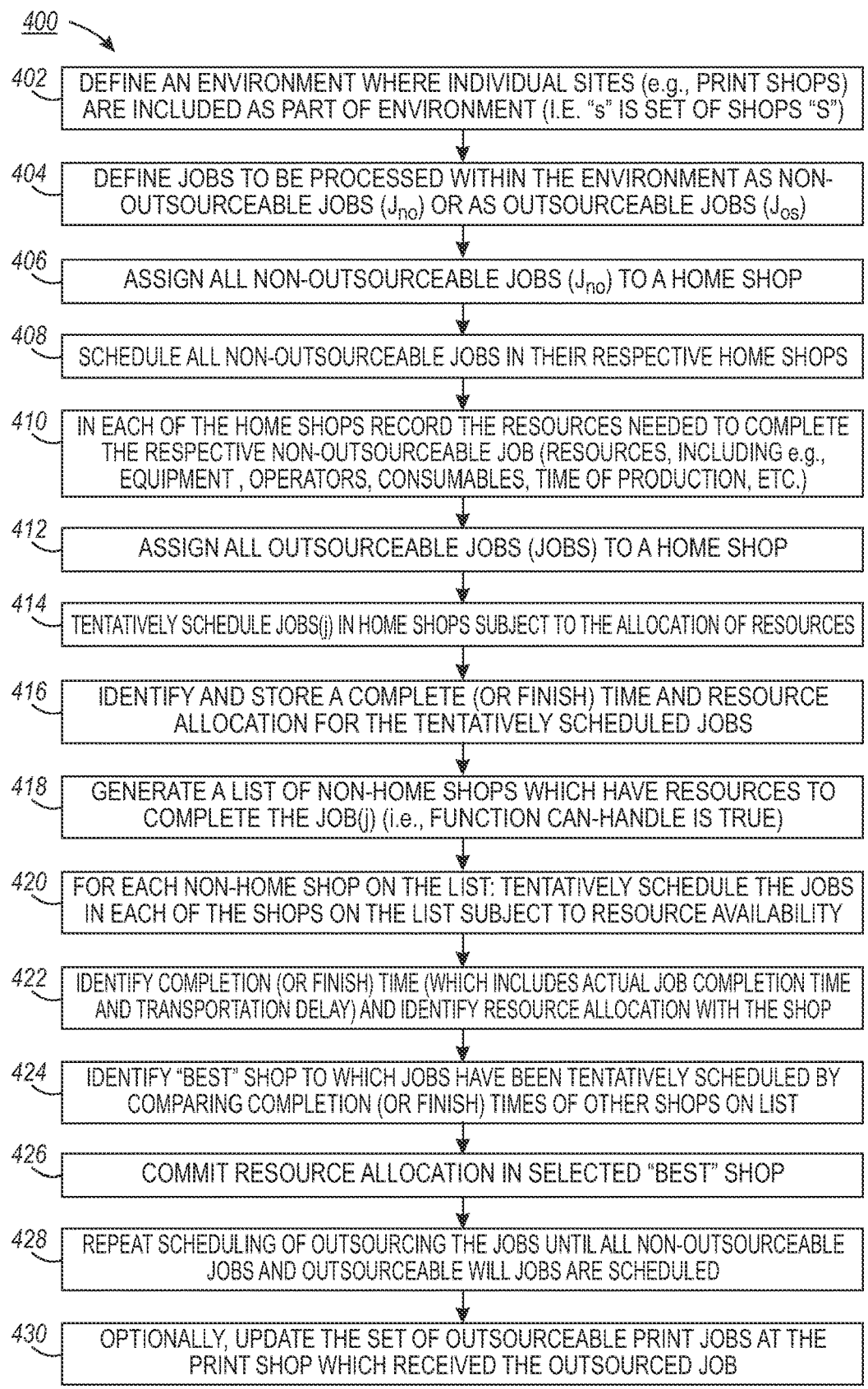
FIG. 4 is a flow diagram illustrating system operation, according to the present application.

Turning now to FIG. 4, a discussion of the above algorithm is expanded upon in connection with flow diagram 400. Initially an environment where individual sites (e.g., print shops) which are to be included as part of the environment are defined 402. Jobs (e.g. print jobs), which are to be processed within the defined environment are then identified to be non-outsourceable ($J_{no}$) or outsourceable jobs ($J_{os}$) 404. Particularly, the system may automatically identify if other print shops have the resources and equipment to handle the print jobs, and then will identify the print jobs accordingly. Also, rules may be included which may exclude a print shop for some reason, even if all resources and equipment are available in a print shop. Also a user may be given authority to identify particular print jobs. Next, all non-outsourceable jobs are assigned to a specific home shop 406. Thereafter, a schedule is generated for all non-outsourceable jobs, each within their own particular home shop 408. Based on the generated schedules, each of the home shops will record the resources needed to complete the scheduled non-outsourceable jobs. Resources here including such things as the equipment, operators, consumables, etc. necessary to complete the job 410. At this point in the process, all non-outsourceable jobs have been scheduled and the resources which will be consumed to produce those jobs according to the schedule had been recorded.

The process next assigns all outsourceable jobs to a specific home shop 412, similar to what was done for the non-outsourceable jobs Next, the outsourceable jobs are tentatively scheduled in their corresponding home shops, subject to the allocation of resources 414. This tentative scheduling means the resources have not actually been committed and the schedule not finally assigned. Rather at this point in time, the system identifies and stores a finish time and the required resource allocation for the tentatively scheduled jobs in the home shops 416.

Following the above, the process generates a list of non-home shops for each outsourceable job. A non-home shop is placed on the list when it is determined the non-home shop has resources capable of completing the corresponding outsourceable job and is not otherwise inaccessible. (i.e., function: can-handle is True) 418. Next, a tentative schedule is generated for each non-home shop on the list of each corresponding outsourceable job, for that corresponding outsourceable job, subject to resource availability 420.

The time to complete each of the outsourceable jobs in each of the non-home shops is identified and stored 422. It is understood that the completion time for an outsourceable job scheduled in a non-home shop will include the job completion time and any transportation delay, such as the time needed to ship the completed job to the home shop. Thus, the completion time for a non-home shop is different from the completion time of the home shop as the home shop does not further include the transportation delay.

At this point, the system has identified the completion times for the outsourceable jobs, when those jobs are scheduled in their own home shop and in any available non-home shops having the appropriate resources and equipment available. The system then identifies the "best" shop to which the job has been tentatively scheduled by comparing the finish times of the outsourced jobs, both when scheduled in the home shop and scheduled in any non-home shops 424. The "best" shop (i.e., the shop with the shortest completion time) is selected and the resource allocation is committed in the selected "best" shop (i.e. either the home shop or one of the non-home shops) 426. This process is repeated for all outsourced jobs until all the outsourced jobs are finally scheduled 428. At this point the scheduling operations may be considered as completed. However optionally, if the print job is outsourced, the job shop which received the outsourced job may update its set outsourced jobs 430.

A system employing a program designed in accordance with the above algorithm and/or flow chart 400 will work with any existing single-site scheduling algorithm, since the algorithm and/or flow chart 400 does not specify how the scheduling of non-outsourceable jobs in each shop should be done. Thus, various single-site algorithms ranging from optimal to greedy scheduling are accommodated equally well, as long as the resource allocations made in a single site are accessible to the multi-site algorithm, which needs to schedule outsourceable jobs around the existing schedules in each shop.

To avoid the combinatorial explosion, the described concepts adopt a multi-site version of the earliest-completion-time scheduling policy by assigning a job to the shop that can complete the job the earliest. As mentioned previously, job completion time is computed differently in a multi-site environment, when a job is handled by a shop other than its home shop. In particular, the delay between the shop where the job is completed and its home shop is added to the actual job completion time. Accounting for such inter-shop delays has the effect of discouraging unnecessary outsourcing activities, unless they truly lead to improved scheduling performance (e.g., the job gets done earlier), among other benefits.

Let $C_i$ be the time complexity of scheduling i number of jobs in a single-site shop. Assuming each shop gets its fair share (e.g., statistically expected amount) of non-outsourceable jobs, it can be shown Step 1 of the above algorithm has the time complexity of:

$$O\left(|S| \times C_{\frac{|J_{no}|}{|S|}}\right)$$

where $|S|$ is the number of shops and $|J_{no}|$ is the total number of non-outsourceable jobs. The complexity of Step 2 is $O(|S| \times |J_{os}| \times C_1)$, where $|J_{os}|$ is the total number of outsourceable jobs. In other words, Step 2 has a time complexity that is linear in both the number of shops and the number of outsourceable jobs. The overall time complexity depends on whether Step 1 dominates Step 2 or not. If scheduling $|J_{no}|/|S|$ jobs in a single-site shop is more expensive than scheduling a single job in a single-site shop $|J_{os}|$ times, then Step 1 becomes the dominating factor and the complexity of the multi-site scheduling algorithm is the same as the complexity of a single-site scheduling algorithm with $|J_{no}|$ number of jobs; otherwise Step 2 is the dominating factor, which makes the complexity of the multi-site scheduling algorithm a factor of $|S|$ more expensive than the single-site algorithm, assuming $|J_{no}|$ and $|J_{os}|$ are comparable.

In the currently described implementation, since C, is roughly $i \times C_1$ (i.e., the complexity of scheduling i jobs is roughly the same as scheduling a single job i times), the overall complexity can be simplified as $O(|J_{no}| \times C_1 + |S| \times |J_{os}| \times C_1)$, which can be further reduced to $O(|S| \times |J_{os}|)$, if $|J_{no}| = O(|J_{os}|)$ and $C_1 = O(1)$. This gives an intuitive result that states the complexity of the multi-site algorithm is linear in the number of shops as well as in the number of outsourceable jobs.

It is understood by one of ordinary skill in the art that when implementing the algorithm of the present application certain implementation issues are to be addressed. Initially, each shop will have its own resources and equipment. Therefore, the production plan (e.g., for an LDP toolkit described in terms of LDP function sequences) will be customized for each shop individually and there is a need to collapse multiple function steps into the longest function sequence that contains all the needed steps. Next, if the system is designed to be backward compatible, all the files of each of the shops (except for the inter-shop delay matrix file) will need to be backward compatible with single-site scheduling and existing toolkits (e.g., a LDP implementation) and this can and will create further constraints that limit the choice of design strategy. Also, there is a need to keep track of jobs that originally belonged to various other shops. This will require a more detailed tracking than is needed when it is assumed that all the jobs come from the same job list, which is no longer true in a multi-site environment.

To test the above concepts, the inventors have experimentally implemented the described multi-site scheduling in C++ and provided a Java Native Interface (JNI) for the Java-based LDP toolkit. The executable runs on both Windows and Linux. The inventors also provided the multi-site scheduler as a Dynamic Link Library (DLL) on Windows and the same DLL handles both single and multi-site scheduling scenarios. One particular aspect of the experimental implementation is that it should not run out of memory on the largest LDP shops or job lists. Since it builds on top of the latest LDP scheduler from Palo Alto Research Center (PARC), this naturally extends all the benefits of this single-site scheduler to the multi-site case without exceptions, including speed, quality, and scalability. In addition, all the advanced features of the PARC single-site scheduler (e.g., intelligent batching with Auto-Splitting and same-machine-for-same-function-sequence scheduling) are available for use in the multi-site case. Thus, there is no loss of functionality in going from single to multi-site scheduling with the present implementation.

Figure 5:
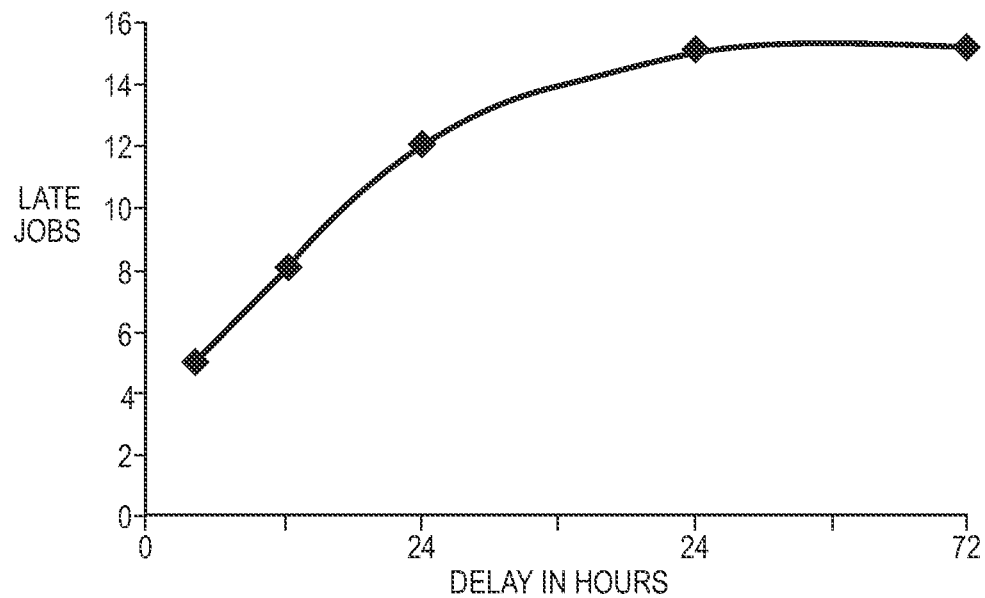
FIG. 5 is a chart plotting the number of late jobs as a function of inter-shop delay.

The implementation also provides the ability to consolidate production resources across shop boundaries, which has been a limiting factor in the LDP world, until now. To demonstrate this, the following experiments were conducted. The multi-site environment of the experiment contained two sites; namely the Shop Y and the Shop Z. As part of the experiment the inter-shop delay was varied between 4 and 72 hours and various performance metrics of the multi-site scheduler were recorded. The total number of outsourceable jobs is 1089 and the number of non-outsourceable jobs is 362, for a total of 1451 jobs. FIG. 5 shows the number of late jobs as a function of inter-shop delay.

The first performance metric collected the number of late jobs, which increases as the inter-shop delay between these two shops (Shop Y and Shop Z) gets longer. But even with a delay of 3 days (i.e., 72 hours on x-axis of FIG. 5), there are only 15 late jobs, roughly 1% of the total of 1451 jobs. For comparison, experiments show the total number of late jobs would become 424, if the two shops were considered in isolation of one another when scheduling these jobs.

Figure 6:
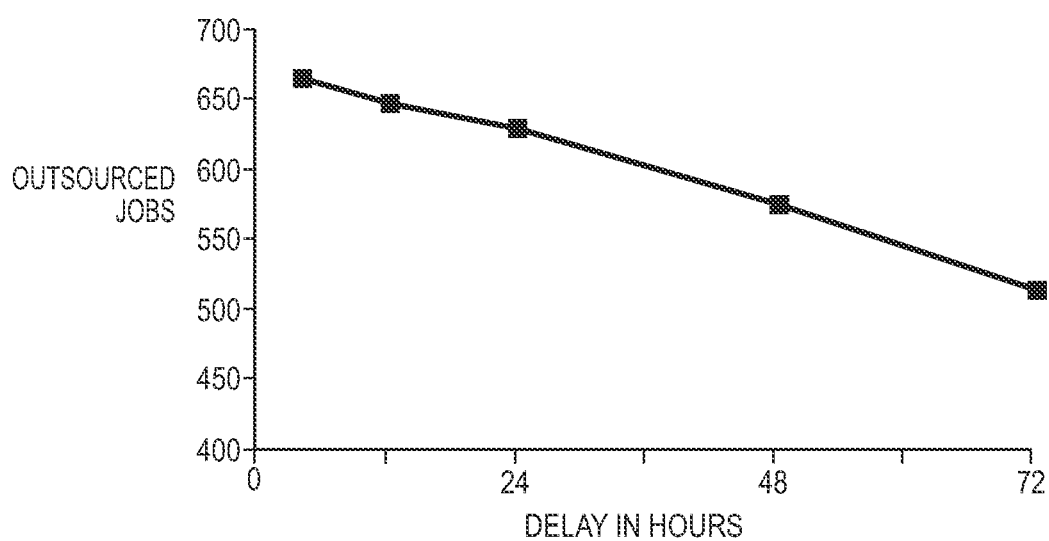
FIG. 6 is a chart plotting the number of outsourced jobs as a function of inter-shop delay.

To help understand the impact of inter-shop delay, FIG. 6 is provided showing the number of outsourced jobs is plotted as a function of the inter-shop delay. Not surprisingly, the number decreases as the delay gets bigger. However, there were still about 500 jobs that got outsourced from one shop to the other even if the inter-shop delay is 3 days (i.e., 72 hours) long. The reason is because shops can be severely overloaded and by outsourcing some of the jobs during peak hours, the production resources in both sites can be better utilized.

Figure 7:
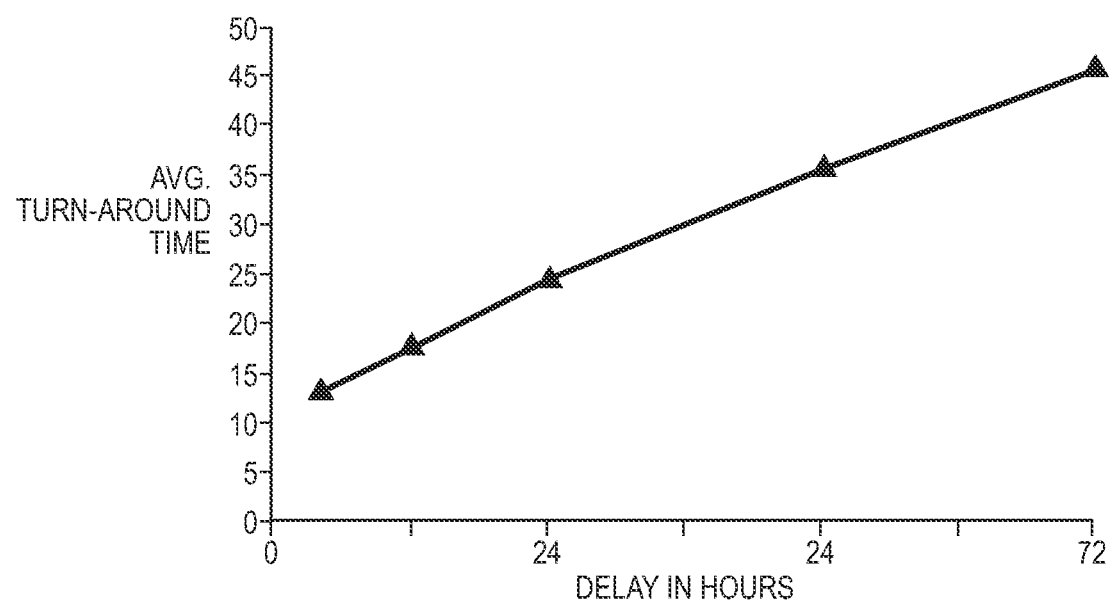
FIG. 7 is a chart plotting the average turnaround time as a function of inter-shop delay.

To measure the overall efficiency of the shops, the average turn-around time metric was used, which is defined as the time elapsed between the arrival of a job and its completion time. FIG. 7 is provided which plots the average turnaround time as a function of inter-shop delay. The shorter the average turn-around time, the better the utilization of the shop and higher the efficiency of the production schedules. As expected, this metric gradually increases as the inter-shop delay increases. However, even with a delay of 3 days, the average turn-around time is about 45 hours, which is significantly less than 222 hours, the average turn-around time of two isolated shops.

From a complexity viewpoint, multi-site scheduling may be computationally more expensive. However, in practice it is not as costly as indicated by the worst-case complexity analysis. In the experiments, the multi-site scheduler completed the task in about 1.7 seconds on a 2 GHz Xeon E5405 processor (with no multi-threading). On the same machine, a single-site scheduler was run on the two shops separately with the same total workload of jobs. The results were as follows. It took 0.391 second to complete the work in Shop Y and 0.922 second to finish the work in Shop Z. Thus, a total of 1.313 CPU seconds were used to schedule both shops separately. Compared with the 1.7 seconds of multi-site scheduling, this is an overhead of 30%, which seems quite reasonable considering the substantial improvements that were made possible by multi-site scheduling.

Additional experiments were also undertaken on multi-site environments with more than two shops involved and the findings are similar to those presented above.

Variations to the system and method described above exist. First, the notion of home shop can be generalized from one shop to multiple shops per job, although the minimum requirement that at least one home shop needs to be specified for every job remains valid even in such an extension. The complication of having multiple home shops is that the due date of a job can become ill-defined, since a single due date for one home shop may not be appropriate for another home shop that is hundreds or even thousands of miles away. In such a case, one would have two choices: (a) define the due date not with respect to any shop, but with respect to when the customer needs to receive the printed job at the door, or (b) define the due date as a vector with one component for each home shop and if the job is handled by any non-home shop then the inter-shop delay to the nearest home shop is added to the actual job completion time to account for the extra transportation delay.

In the above described system and method, the cost of transportation has not been taken into consideration, which is usually not free and can have a significant commercial impact. Thus, a second variation is to factor in the transportation cost in addition to the time delay incurred and perform joint optimization over time and dollar cost, using either (a) multi-objective optimization or (b) a universal "currency" that offers an exchange rate between time and dollar cost, making single-objective optimization relevant again. A related variation would be to consider the difference in cost incurred by different shops for producing the same job. For example, a print shop of COMPANY A may agree to print jobs for, for unrelated COMPANY B, if it finds that it has extra capacity available. However, the cost of producing the same document at the shop owned by COMPANY A may be different than that of the shop owned by COMPANY B. Thus, in addition to the transportation delay, the production cost can become relevant in enterprise allocation. Similar to the transportation cost, the cost of production can be factored in by using either multi-objective optimization or the universal currency approach mentioned above.

As a third variation of the described system and method, one can easily imagine the multi-site algorithm being applied to loosely coupled single-site shops with multiple production cells such that the transportation delay among these cells is non-trivial (e.g., ignoring such delays would render most of the schedules becoming unrealistic or unexecutable). Thus, the inter-cell transportation delay must be explicitly modeled and accounted for by the single-site scheduler. This is likely to create more value for large single-site shops that, for example span multiple buildings in the same city block.

This presently presented subject matter describes a number of important generalizations of scheduling toolkits (e.g., the LDP toolkit) to consolidate production resources that are distributed across multiple geographically dispersed locations with various transportation delays. The framework proposed here is general, effective, yet backward compatible with existing algorithms and tools. Experiments confirmed the benefits of the described approach to multi-site scheduling. Also described are variations that can create additional value for LDP beyond the capability of the current toolkit.

In still another embodiment, the time delay matrix represented in the example of Table 1 may be dynamic instead of static. For example, delays from Site A to Site C might change depending on the day of the week (e.g., the delay time might be 48 hours on Monday, but only 24 hours on a Saturday). Thus when implementing a system according to the present concepts, the time delays used by the present system are represented in a dynamic fashion. In one case the system identifies the day and uses a matrix for that date in its calculations.

Thus, from the forgoing discussion it has been explained that the present system and method generalizes an assumption that print jobs can be sent to print shops other than a print shop the print job is presently located at by allowing only a subset of print jobs in a print shop to be outsourceable, and the set of outsourceable jobs do not have to be non-empty.

Another teaching of the present disclosure is that a plurality of print shops may exist in the multi-site environment, and so expands the scheduling to environments having more than two print shops. In addition, the scheduling decision in the current disclosure assumes the most general form of schedules: a subset of jobs can be processed at some shop or a subset of shops, as long as all jobs are processed in the end. This avoids a more restricted assumption form which would require either the processing of all jobs occurring solely at the first print shop or solely at the second print shop.

Still further, in the present disclosure, when scheduling in a multi-site environment it has been taught that it is not required to obtain and use an accurate estimation of the per-job turnaround time for each job, which may be difficult to obtain, especially if the shop workload is dynamic and/or the job sizes follow a long-tail distribution. The concepts of the present application also do not require the use of an iterative load-balancing metric to distribute the jobs across multiple print sites. Rather in the present application the actual job completion time for each print job and print shop is used to determine how jobs should be distributed. Thus, the approach of the present application is effective even without accurate estimations of the metrics described above.

It will be appreciated that variations of the above-disclosed and other features and functions, or alternatives thereof, may be desirably combined into many other different systems or applications. For example, while the foregoing has described the concepts in the environment of print shops and print jobs, it is understood the scheduling of other manufactured items may also make use of these ideas. Therefore a shop may be a manufacturing shop other than a print shop and a job may be a job to manufacturing an item of product other than a print job. Also, that various presently unforeseen or unanticipated alternatives, modifications, variations or improvements therein may be subsequently made by those skilled in the art which are also intended to be encompassed by the following claims.

What is claimed is:

1. A system for managing scheduling of a plurality of jobs in a multi-site cell based shop environment comprising:
   a plurality of cell based print shops having resources and equipment to complete at least one type of job; and
   a multi-site cell based scheduler configured to automatically assign and schedule jobs to one of a home shop or a non-home shop, based on an earliest completion time, each of the plurality of scheduled jobs configured to specify its home shop, wherein the home shop includes all equipment and resources necessary for producing and completing a job, wherein a completion time of a job in a particular home shop is defined as an actual time taken to complete the job and a completion time of a job in a particular non-home shop is defined as the actual time taken to complete the job and a transportation delay, wherein the transportation delay is defined as a time taken in hours to transport a completed job from the particular non-home shop to the completed job's home shop, wherein resources are tentatively allocated and a schedule is tentatively generated for both the home shop and for the particular non-home shop to both produce the print job in accordance with print data corresponding to the print job, the resources including at least equipment, operators, and consumables needed to complete the job, wherein the transportation delay is determined via a transportation delay matrix generated in accordance with symmetric and asymmetric delays corresponding to transportation of the print job to and from each non-home shop and the home shop, wherein at least one of the asymmetric delays includes a security constraint such that the home shop includes a first security clearance level and a non-home shop includes a second security clearance level, wherein the first security clearance level and the second security clearance level are neither more nor less secure than the other such that the first and second security levels are incompatible, wherein the security constraint is enforced by modeling the transportation delay between the home shop and the non-home shop as an infinite transportation delay to the at least one of the home shop or the non-home shop, and wherein the multi-site cell based scheduler is implemented using at least one electronic processor.

2. The system according to claim 1 wherein the transportation delay is a static delay, defining a time needed to ship the completed job to the competed job's home shop from the particular non-home shop.

3. The system according to claim 1 wherein the transportation delay is a dynamically changing delay, defining a time needed to ship the completed job to the completed job's home shop from the particular non-home shop.

4. The system according to claim 1 wherein a single job has a single home shop, the home shop including all necessary resources to complete the single job.

5. The system according to claim 1 wherein a single job has multiple home shops, the home shops each including all necessary resources to complete the job, the resources including at least two of equipment, consumables, and operators.

6. The system according to claim 1 wherein the transportation delay further includes transportation cost.

7. The system according to claim 1 wherein the transportation delay further includes production cost.

8. The system according to claim 1 wherein the multi-site cell based scheduler is configured to assign and schedule print jobs in loosely coupled single-site shops by explicit modeling of inter-cell delays, wherein at least one of the inter-cell delays corresponds to an operator resource.

9. The system according to claim 1 wherein the multi-site cell based scheduler is configured to operate with a multi-site earliest-completion-time scheduling policy, wherein the earliest-completion-time includes delays attributable to an operator resource.

10. The system according to claim 1, wherein the multi-site cell based scheduler is a distributed configuration wherein portions of the multi-site scheduler are at different print shop locations.

11. The system according to claim 1, wherein each of the plurality of jobs is defined as outsourceable or non-outsourceable, wherein an outsourceable job is available to be sent to a non-home shop and a non-outsourceable job is required to be maintained in its own home shop.

12. A method for managing a scheduling of a plurality of print jobs in a multi-site cell based print shop environment comprising:

defining a plurality of cell based print shops having resources and equipment to complete at least one type of print job as part of a multi-site cell based printing environment; and configuring a multi-site cell based scheduler to automatically assign and schedule print jobs to one of a home shop and a non-home shop, based on an earliest completion time, each of the plurality of scheduled jobs configured to specify its home shop, wherein the home shop includes all equipment and resources necessary for producing a job, wherein a completion time of a print job in a particular home shop is defined as an actual time taken to complete the print job and a completion time of a print job in a particular non-home shop is defined as the actual time taken to complete the print job and a transportation delay, wherein the transportation delay is defined as a time taken to transport a completed job from the particular non-home shop to the completed job's home shop, wherein resources are tentatively allocated and a schedule is tentatively generated for both the home shop and for the particular non-home shop for print data corresponding to the print job to both produce the print job, wherein the transportation delay is determined via a transportation delay matrix generated in accordance with symmetric and asymmetric delays corresponding to transportation of the print job to and from each non-home shop and the home shop, wherein at least one of the asymmetric delays includes a security constraint such that the home shop includes a first security clearance level and a non-home shop includes a second security clearance level, wherein the first security clearance level and the second security clearance level are neither more nor less secure than the other such that the first and second security levels are incompatible, wherein the security constraint is enforced by modeling the transportation delay between the home shop and the non-home shop as an infinite transportation delay to the at least one of the home shop or the non-home shop, and wherein the multi-site cell based scheduler is implemented using at least one electronic processor.

13. The method according to claim 12 wherein the transportation delay is a static delay, defining a time needed to ship the completed job to the completed job's home shop from the particular non-home shop.

14. The method according to claim 12 wherein the transportation delay is a dynamic delay, defining a time needed to ship the completed job to the completed job's home shop from the particular non-home shop.

15. The method according to claim 12 wherein a single job has a single home shop, the home shop including all resources necessary to output the single job.

16. The system according to claim 12 wherein a single job has multiple home shops, the home shops each including all necessary resources to complete the job, the resources including at least two of equipment, consumables, and operators.

17. The system according to claim 12 wherein the transportation delay further includes transportation cost as part of its optimization objective.

18. The method according to claim 12 wherein the transportation delay further includes production cost as part of its optimization objective.

19. The method according to claim 12 wherein the multi-site scheduler is configured to assign and schedule print jobs in loosely coupled single-site shops where explicit modeling of inter-cell delays is necessary, wherein at least one of the inter-cell delays corresponds to an operator resource.

20. The method according to claim 12 wherein the multi-site scheduler is configured to operate with a multi-site earliest-completion-time scheduling policy, wherein the earliest-completion-time includes delays attributable to an operator resource.

21. The method according to claim 12, further including implementing the multi-site scheduler as a distributed configuration wherein portions of the multi-site scheduler are at different print shop locations.

22. The method according to claim 12, wherein each of the plurality of jobs is defined as outsourceable or non-outsourceable, wherein an outsourceable job is available to be sent to a non-home shop, and a non-outsourceable job is required to be maintained in its own home shop.

23. A method of scheduling jobs in shops in a multi-site cell based shop environment comprising:
    defining a multi-site cell based environment to include a plurality of individual shops as part of the multi-site cell based environment;
    defining jobs to be processed within the multi-site cell based environment as non-outsourceable jobs or as outsourceable jobs;
    automatically assigning non-outsourceable jobs to a corresponding home shop;
    scheduling non-outsourceable jobs in their respectively assigned home shops;
    recording the resources needed to complete the respective non-outsourceable jobs in each of the home shops;
    automatically assigning all outsourceable jobs to a home shop;
    tentatively scheduling jobs in corresponding home shops subject to the allocation of resources for print data corresponding to the jobs;
    identifying a completion time and resource allocation for the tentatively scheduled outsourceable jobs in the respective home shops, wherein the completion time is the actual time to complete the outsourceable jobs;
    generating a list of non-home shops which have resources to complete the outsourceable jobs;
    for each non-home shop on the generated list, tentatively scheduling the outsourceable jobs in each of the non-home shops on the generated list and tentatively allocating corresponding resources in each of the non-home shops on the generated list prior to a selection of a shop to complete the outsourceable job;
    generating a transportation delay matrix in accordance with symmetric and asymmetric delays corresponding to transportation of the print job to and from each home shop and each non-home shop on the generated list and at least one security constraint associated with the outsourceable job, wherein at least one of the asymmetric delays includes a security constraint such that the home shop includes a first security clearance level and a non-home shop includes a second security clearance level, wherein the first security clearance level and the second security clearance level are neither more nor less secure than the other such that the first and second security levels are incompatible, wherein the security constraint is enforced by modeling the transportation delay between the home shop and the non-home shop as an infinite transportation delay to the at least one of the home shop or the non-home shop;
    identifying a completion time for the outsourceable jobs tentatively scheduled in the non-home shops and the resource allocation to complete the outsourceable jobs, wherein the completion time is the actual completion time and a transportation delay determined from the transportation delay matrix, and wherein the transportation delay is defined as a time taken to transport a completed job from the particular non-home shop to the completed job's home shop;
    identifying a best shop to which each of the outsourceable jobs have been tentatively scheduled by comparing completion times, wherein the best shop is understood to be the shop with an earliest job completion time; and
    formalizing scheduling and resource allocation in selected best shops, wherein at least some of the steps are implemented using at least one electronic processor.

* * * * *

UNITED STATES PATENT AND TRADEMARK OFFICE
CERTIFICATE OF CORRECTION

PATENT NO. : 10,732,913 B2
APPLICATION NO. : 13/156573
DATED : August 4, 2020
INVENTOR(S) : Zhou et al.

It is certified that error appears in the above-identified patent and that said Letters Patent is hereby corrected as shown below:

On the Title Page

Item (73), should read:
(73) Assignees: PALO ALTO RESEARCH CENTER INCORPORATED, Palo Alto CA (US);
XEROX CORPORATION, Norwalk, CT (US)

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*